US012688322B2

(12) United States Patent
Sun et al.

(10) Patent No.: US 12,688,322 B2
(45) Date of Patent: Jul. 21, 2026

(54) METHOD AND APPARATUS FOR PROTECTING DATA, AND DEVICE AND MEDIUM

(71) Applicant: Lemon Inc., Grand Cayman (KY)

(72) Inventors: Jiankai Sun, Los Angeles, CA (US); Xin Yang, Los Angeles, CA (US); Yuanshun Yao, Los Angeles, CA (US); Junyuan Xie, Beijing (CN); Chong Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/837,078

(22) PCT Filed: Feb. 2, 2023

(86) PCT No.: PCT/SG2023/050057
§ 371 (c)(1),
(2) Date: Aug. 8, 2024

(87) PCT Pub. No.: WO2023/154005
PCT Pub. Date: Aug. 17, 2023

(65) Prior Publication Data
US 2025/0148111 A1 May 8, 2025

(30) Foreign Application Priority Data
Feb. 8, 2022 (CN) .......................... 202210119229.1

(51) Int. Cl.
*G06F 21/62* (2013.01)
(52) U.S. Cl.
CPC ................................ *G06F 21/6218* (2013.01)

(58) Field of Classification Search
CPC .. G06F 21/6218; G06F 21/6245; G06F 21/71; G06F 18/241; G06F 18/2415;
(Continued)

(56) References Cited

U.S. PATENT DOCUMENTS

| 2022/0092336 A1* | 3/2022 | Yu ....................... G06V 30/1914 |
| 2022/0198339 A1* | 6/2022 | Zhao ..................... G06F 18/214 |
| 2024/0220641 A1* | 7/2024 | Sun ........................... G06N 3/08 |

FOREIGN PATENT DOCUMENTS

| CN | 112084520 A | 12/2020 | |
| CN | 113297573 A * | 8/2021 | ............. G06N 20/20 |

(Continued)

OTHER PUBLICATIONS

Office Action for Singapore Application No. 11202405424T, mailed on Nov. 7, 2024, 7 pages.
(Continued)

*Primary Examiner* — Anh Nguyen

(57) ABSTRACT

A method and apparatus for protecting data, and a device and a medium are provided. The method comprises acquiring, by a first device, a feature representation generated by a second device on the basis of sample data and according to a second model, wherein the first device has label information for the sample data; and the first device and the second device are used for jointly training a first model at the first device and the second model at the second device. The method further comprises generating, by the first device, a prediction label for the sample data on the basis of the feature representation and according to the first model. The method further comprises determining, by the first device and on the basis of the feature representation, the label information and the predicted label, a total loss value used for training the first model and the second model.

17 Claims, 5 Drawing Sheets

(58) Field of Classification Search
CPC .......... G06F 21/60; G06N 3/047; G06N 3/08;
G06N 20/20
See application file for complete search history.

(56) References Cited

FOREIGN PATENT DOCUMENTS

CN       113378693  A  *  9/2021  .......... G06F 18/253
CN       113722738  A     11/2021

OTHER PUBLICATIONS

International Search Report mailed Sep. 9, 2023 in International
Application No. PCT/SG2023/050057.
Office action received for Chinese patent application No.
202210119229.1 mailed on Feb. 13, 2026, 9 pages (Original docu-
ment only).
Sun et al., Defending against reconstruction attack in vertical
federated learning, arXiv preprint arXiv:2107.09898, Jul. 21, 2021,
pp. 1-8.

* cited by examiner

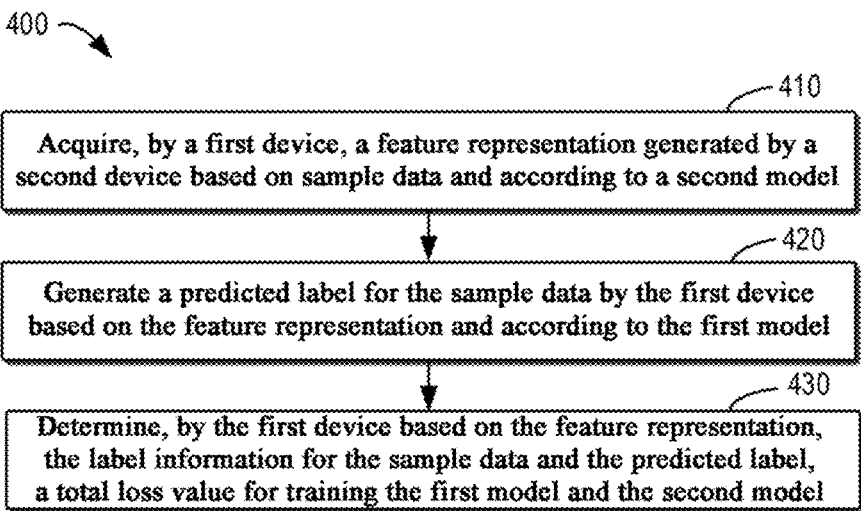

400

410

Acquire, by a first device, a feature representation generated by a second device based on sample data and according to a second model

420

Generate a predicted label for the sample data by the first device based on the feature representation and according to the first model

430

Determine, by the first device based on the feature representation, the label information for the sample data and the predicted label, a total loss value for training the first model and the second model

Fig.4

METHOD AND APPARATUS FOR PROTECTING DATA, AND DEVICE AND MEDIUM

CROSS REFERENCE TO RELATED APPLICATIONS

This application is a National Stage of International Application No. PCT/SG2023/050057 filed Feb. 2, 2023, which claims benefit of Chinese Patent Application No. 202210119229.1 filed Feb. 8, 2022, both of which are herein incorporated by reference in their entireties.

FIELD

Example embodiments of the disclosure generally relate to the field of computers, and particularly relate to a method and apparatus for protecting data, a device, and a computer-readable storage medium.

BACKGROUND

Machine learning technologies have been used in various industries as artificial intelligence technologies grow. A processing model for completing a particular function can be trained based on pre-collected training data. However, some training data may involve user privacy and/or other sensitive data. In this case, how to more securely collect the training data and use it for training the processing model becomes a research focus. A technical solution of jointly training a model between a first party having label information of data and a second party having no label information has been proposed at present. However, the existing technical solution has no ideal performance and thus cannot effectively prevent sensitive information from being leaked.

SUMMARY

According to an embodiment of the disclosure, a solution for protecting data is provided.

In a first aspect of the disclosure, a method for protecting data is provided. The method includes acquiring, by a first device, a feature representation generated by a second device based on sample data and according to a second model. The first device has label information for the sample data. The first device and the second device are configured to jointly train a first model at the first device and the second model at the second device. The method further includes generating a predicted label for the sample data by the first device based on the feature representation and according to the first model; and determining, by the first device based on the feature representation, the label information and the predicted label, a total loss value for training the first model and the second model.

In a second aspect of the disclosure, an electronic device is provided. The device includes at least one processing unit; and at least one memory. The at least one memory is coupled to the at least one processing unit and stores an instruction configured to be executed by the at least one processing unit. When executed by the at least one processing unit, the instruction causes the device to execute actions as follows: acquiring, by the electronic device, a feature representation generated by a second device based on sample data and according to a second model, where the electronic device has label information for the sample data, and the electronic device and the second device are configured to jointly train a first model at the electronic device and the second model at the second device; generating a predicted label for the sample data by the electronic device based on the feature representation and according to the first model; and determining, by the electronic device based on the feature representation, the label information and the predicted label, a total loss value for training the first model and the second model.

In a third aspect of the disclosure, an apparatus for protecting data is provided. The apparatus includes: an acquisition module configured to acquire a feature representation generated by a second device based on sample data and according to a second model, where the apparatus has label information for the sample data, and the apparatus and the second device are configured to jointly train a first model at the apparatus and the second model at the second device; a label prediction module configured to generate a predicted label for the sample data based on the feature representation and according to the first model; and a total loss value determination module configured to determine, based on the feature representation, the label information and the predicted label, a total loss value for training the first model and the second model.

In a fourth aspect of the disclosure, a computer-readable storage medium is provided. The medium has a computer program stored thereon, which, when executed by a processor, implements the method in the first aspect.

It should be understood that a description in the summary is neither intended to limit key features or important features of embodiments of the disclosure, nor intended to limit the scope of the disclosure. Other features of the disclosure will become easy to understand through the following descriptions.

BRIEF DESCRIPTION OF THE DRAWINGS

The above and other features, advantages and aspects of various embodiments of the disclosure will become more apparent in combination with accompanying drawings and with reference to the following detailed descriptions. In the figures, the same or similar reference numerals denote the same or similar elements, in which:

FIG. 4 shows a flow diagram of a process for protecting data according to some embodiments of the disclosure;

DETAILED DESCRIPTION OF EMBODIMENTS

Figure 1:
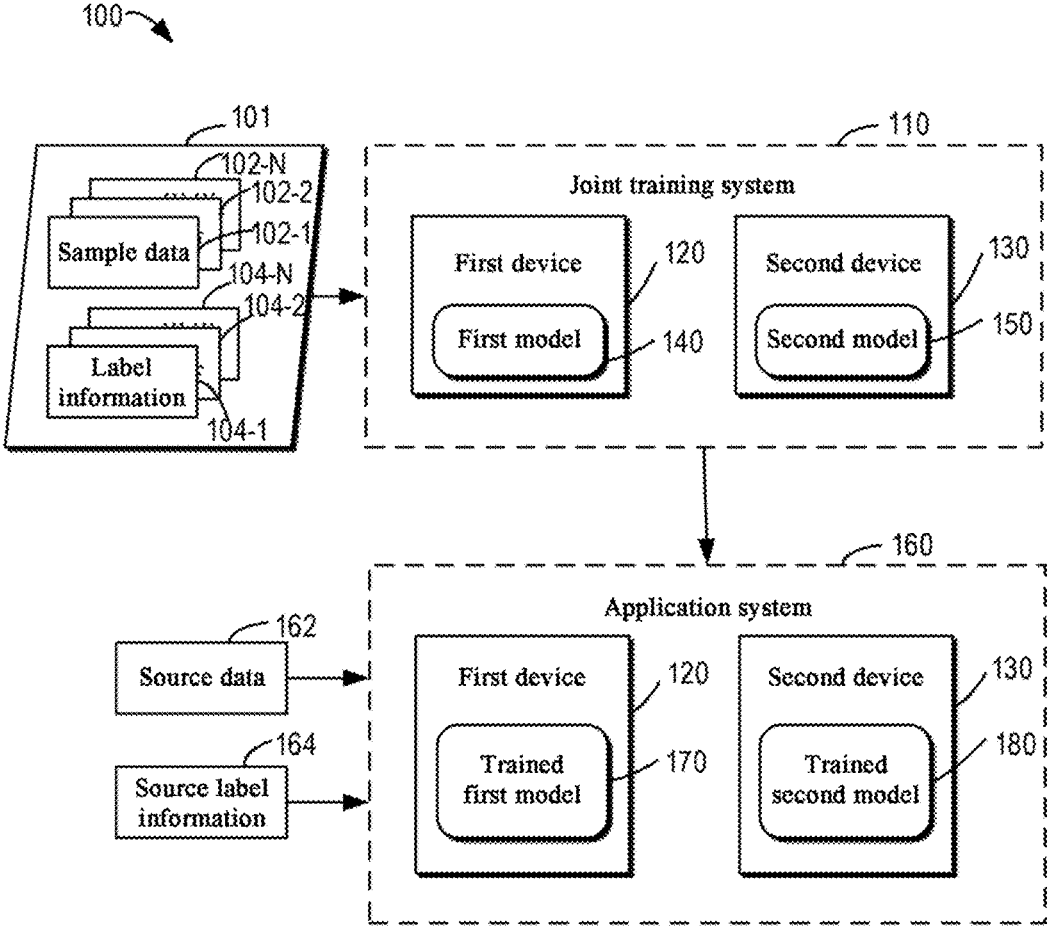
FIG. 1 shows a schematic diagram of an exemplary environment in which an embodiment of the disclosure can be implemented.

Embodiments of the disclosure will be described in more detail below with reference to the accompanying drawings. Although some embodiments of the disclosure are shown in accompanying drawings, it should be understood that the disclosure can be implemented in various forms and should not be construed as being limited to the embodiments stated herein. On the contrary, these embodiments are provided such that the disclosure can be understood more thoroughly and completely. It should be understood that accompanying drawings and embodiments of the disclosure are for exemplary purposes only and are not intended to limit the scope of protection of the disclosure.

In the descriptions of embodiments of the disclosure, the term "include" and its similar terms should be interpreted as open inclusion, that is, "including but not limited to". The terms "base on" and "based on" should be interpreted as "at least partially based on" and "at least partially based on". The term "an embodiment" or "the embodiment" should be interpreted as "at least one embodiment". The term "some embodiments" should be interpreted as "at least some embodiments". Other explicit and implicit definitions may further be included below.

As used herein, the term "model" can learn an association between a corresponding input and output from training data such that a corresponding output can be generated for a given input after training. The model can be generated based on machine learning technology. Deep learning is a type of machine learning algorithms that process an input and provide a corresponding output by using a plurality of layers of processing units. A neural network model is an instance of a model based on deep learning. Herein, a "model" may also be referred to as a "machine learning model", a "learning model", a "machine learning network" or a "learning network". These terms are interchangeably used herein. As used herein, the term "determine a parameter of a model" or similar expressions refer to determining a value (also referred to as a parameter value) of a parameter of a model, which includes a specific value, a value set or a value range.

A "neural network" is a type of machine learning networks based on deep learning. A neural network can process an input and provide a corresponding output, and generally includes an input layer, an output layer and one or more hidden layers between the input layer and the output layer. A neural network used in a deep learning application generally includes plenty of hidden layers, such that the depth of the network is increased. The layers of the neural network are connected in sequence such that an output of a previous layer is provided as an input to a subsequent layer. The input layer receives an input to the neural network, and an output of the output layer serves as a final output of the neural network. Each layer of the neural network includes one or more nodes (also referred to as processing nodes or neurons), and each node processes an input from the previous layer.

Generally, machine learning can roughly include three phases, that is, a training phase, a test phase and an application phase (also referred to as an inference phase). In the training phase, a given model can be trained by using a large amount of training data. Parameter values of the model are iteratively updated until the model can obtain, from the training data, a consistent inference satisfying an expected goal. Through training, a model can be considered to be able to learn an association (also referred to as mapping from an input to an output) between an input to an output from the training data. Parameter values of the trained model are determined. In the test phase, test inputs are applied to the trained model such that whether the model can provide a correct output can be tested, and the performance of the model can be determined. In the application phase, the model can be configured to process an actual input to determine a corresponding output based on parameter values obtained through training.

In the field of machine learning, a prediction model can be trained by using a training dataset including a large amount of training data such that the prediction model can complete a desired function. As the volume of data increases, the data is generally stored in a scattered manner at different storage positions, such as different enterprise parties. As data regulatory policies become increasingly stringent and data privacy protection issues get increasingly more attention, it is difficult for traditional centralized machine learning technologies to ensure data privacy protection.

Distributed machine learning technologies have been proposed at present. For instance, different participants can have respective machine learning models. Between the participants, model parameters can be transmitted and data can be pushed. Moreover, sensitive data including sensitive information of an individual user is stored only at one participant and would not be transmitted to other participants.

For instance, in the online advertising industry, a media side (a passive participant) can push an advertisement to a user. If the user views the advertisement at the media side and carries out actions such as purchase, registration or information requirements on an advertiser side (an active participant), data associated with the advertisement may be labeled at the advertiser side to annotate the above actions of the user. The advertiser side can infer information by using the label information generated above, such as sensitive business information, for example, a user size, a revenue size, etc. The prediction model can be trained by using training data such that the prediction model can infer the user size, the revenue size, etc. However, the above label information is important for an advertiser and is sensitive data required to be protected. The advertiser side does not want the label information to be leaked, for instance, does not want the media side to steal the label information. Therefore, the sensitive data is required to be prevented from being leaked when the training data is acquired.

At present, a technical solution of jointly training a model between a first party having label information of data and a second party having no label information has been proposed. Herein, the first party having the label information of the data is also referred to as an "active participant", while the second party having no label information of data is also referred to as a "passive participant". In a solution of jointly training a model (also referred to as federated learning of a model), the label information of the data is stored only at the active participant and is not transmitted to the passive participant. Insensitive data and/or model parameters, etc., may be transmitted between the active participant and the passive participant such that a model at the active participant and a model at the passive participant can be trained respectively. For instance, the active participant may determine gradient information for updating the prediction model and transmit the gradient information to the passive participant. The passive participant can train a model by using the gradient information without acquiring sensitive data such as label information.

However, an attacker can predict, using technologies such as spectral clustering, label information from data information having no label information. In order to prevent the label information from being acquired (for instance, predicted) by the attacker, that is, in order to protect sensitive information, some solutions for protecting relational label information have been proposed. For instance, the label information can be protected through deep leakage from gradients (DLG) and improved DLG (iDLG).

Specifically, the DLG finds that the passive participants can infer corresponding user label information from a gradient shared by the active participant. The DLG first generates random dummy training input data and label information, and such information is propagated forward to generate a dummy gradient. By minimizing the difference between the dummy gradient and a true gradient, the DLG can infer a training input and label information corresponding thereto. The iDLG is an improvement on the DLG. Specifically, the iDLG finds that the DLG cannot infer, with high quality, label information of the active participant. In a binary-classification task and in a setting of using cross-entropy as a loss function, the iDLG finds a correlation between label information and loss, and a gradient sign of a last layer of logit. Then, the iDLG can analyze the gradient of a parameter according to the above findings to infer label information for a training sample. Both the DLG and the iDLG require the passive participant to own the model structure of each participant in overall federated learning, which is difficult to achieve in reality.

In addition, a solution of adding noise to gradient information to prevent sensitive information from being leaked has been proposed. However, in a scene in which the attacker is extremely capable, the attacker may be able to predict, based on a feature representation obtained from the sample data, label information that is extremely close to true label information. In this case, even though the noise is added to the gradient information to prevent the attacker from predicting label information by using the gradient information, the situation that the attacker infers the label information according to the feature representation obtained from the sample data cannot be prevented.

To sum up, the existing solutions for protecting data have plenty of defects, and it is difficult to acquire a satisfactory results. Therefore, it is desirable that the label information can be prevented from being leaked and the sensitive data can be protected through a more effective method.

According to an embodiment of the disclosure, a solution for protecting data is provided to solve one or more of the above problems and other potential problems. In the solution, a predicted label for sample data is predicted by a first device (of an active participant) using a first model and according to a feature representation generated based on sample data by a second model of a second device (of a passive participant). The first device further determines a total loss value based on the feature representation, true label information of the sample data, and the obtained predicted label. The first device may further adjust a parameter of the first model at the first device based on the total loss value. In addition, the first device may further cause the second device to adjust, based on a gradient associated with the total loss value, a parameter of the second model at the second device.

In the solution, it is not required to know structures of models of all participants (that is, models at all devices). Only the feature representation generated by the second device and the gradient associated with the total loss value are shared between the first device and the second device, and sensitive information such as label information is not shared.

In addition, through the solution, a parameter of the first model and/or the second model is adjusted by using the total loss value. The total loss value is associated with the feature representation, the label information and the predicted label. In this way, an appropriate total loss value can be determined by setting an appropriate loss function such that a correlation between the feature representation and the label information can be reduced. Thus, the situation that the passive participant (or the second device) predicts the label information of the data based on the feature representation for the sample data can be prevented, thereby the sensitive data can be protected.

Hereinafter, an example environment of an exemplary implementation according to the disclosure will be described first with reference to FIG. 1.

Example Environments

FIG. 1 shows a schematic diagram of an example environment 100 in which an embodiment of the disclosure can be implemented. In the environment 100 of FIG. 1, it is desirable to train and apply a first model 140 at a first device 120 and/or a second model 150 at a second device 130. The first device 120 may be a device of an active participant. Herein, the first device 120 may also be referred to as an active participant device, and the first model 140 may also be referred to as an active participant model. The second device 130 may be a device of a passive participant. Herein, the second device 130 may also be referred to as a passive participant device, and the second model 150 may also be referred to as a passive participant model. The first device 120 and the second device 130 may interact over a network to receive or transmit data or messages, etc. In some embodiments, the first model 140 and the second model 150 may be configured to execute the same or different functions or tasks such as prediction tasks and classification tasks.

In general, the environment 100 includes a joint training system 110 and an optional application system 160. In the example embodiment of FIG. 1 and some example embodiments that will be described below, the joint training system 110 is configured to jointly train the first model 140 and the second model 150 at the first device 120 and the second device 130 by using a training dataset 101. The training dataset 101 may include sample data 102-1, 102-2, . . . , and 102-N and associated label information 104-1, 104-2, . . . , and 104-N, where N is an integer greater than or equal to 1. For ease of discussion, the sample data 102-1, 102-2, . . . , and 102-N may be collectively or individually referred to as sample data 102, and the label information 104-1, 104-2, . . . , and 104-N may be collectively or individually referred to as label information 104.

Each piece of sample data 102 may have corresponding label information 104. The label information 104 may include sensitive data of a process of processing the sample data 102 by a user. In an example in which the advertiser side is the active participant and the media side is the passive participant, a processing behavior may occur at the advertiser side after the user clicks on an advertisement at the media side. For instance, if a user is influenced by a media-side advertisement such that behaviors such as purchase, registration or information requirements occur at the advertiser side, it is indicated that a processing behavior occurs (also referred to as a conversion occurs) at the advertiser side.

In some embodiments, positive label 1 may be used to denote that the above conversion behavior occurs in one piece of sample data, that is, denote that the sample data is a positive sample. If no conversion occurs, negative label 0 is used to denote that the sample data is a negative sample. It should be understood that in some embodiments, each piece of sample data may be labeled through other methods. For instance, in cases of the behaviors of purchase, registration and information requirement, labels 3, 2 and 1 are added to sample data respectively, and 0 is also used as a label for no conversion. It should be understood that the instances of the label information listed above are merely exemplary and are not intended to limit the scope of the disclosure.

In some embodiments, the label information 104 described above may be known only by the first device 120. In some embodiments, the first device 120 may be configured to infer sensitive business information, such as user and revenue sizes, of an advertiser based on the label information 104. The label information 104 is important information that the active participant (that is, the first device 120) is required to protect. Therefore, it is undesirable that the second device 130 acquires the label information 104. That is, the second device 130 may have no label information 104.

Parameter values of the first model 140 and the second model 150 may be initialized before joint training. Through the joint training, the parameter values of the first model 140 and the second model 150 are updated and determined. After the joint training, the trained first model 170 and the trained second model 180 have parameter values after training. On the basis of such parameter values, the trained first model 170 and the trained second model 180 can be configured for various processing tasks such as user size prediction. In some embodiments, the first model 140 and the second model 150 may be any appropriate neural network models. For instance, in the examples of positive and negative label information, the first model 140 and the second model 150 may be models for binary classification. The first model 140 and the second model 150 may each include a hidden layer, a logit layer, a softmax layer, etc.

The environment 100 optionally includes an application system 160. The application system 160 may be configured to execute various processing tasks on source data 162 and/or source label information 164 using the trained first model 170 and the trained second model 180. In some embodiments, the first device 120 or the trained first model 170 has the source label information 164. In contrast, the second device 130 or the trained second model 180 has no source label information 164. The application system 1 60 may further include other models or operations that are not shown, so as to complete corresponding inferences or other tasks.

In FIG. 1, the joint training system 110 and the application system 160 may be any system having computing power, such as various computing devices/systems, terminal devices, and servers. The terminal device may be any type of mobile device, fixed terminal or portable terminal, including a mobile phone, a desktop computer, a laptop computer, a notebook computer, a netbook computer, a tablet computer, a media computer, a multi-media tablet, or any combination of the foregoing, including accessories and peripherals of these devices, or any combination thereof. The servers include but are not limited to mainframes, edge computing nodes, computing devices in cloud environments, etc.

It should be understood that components and arrangements in the environment shown in FIG. 1 are merely examples. A computing system appropriate for being configured to implement the embodiments described in the disclosure can include one or more different components, other components and/or different arrangements. For instance, although shown as separate, two or more items of the joint training system 110 and the application system 160 may be integrated into the same system or device. Embodiments of the disclosure are not limited in this respect.

Embodiments of model joint training will be described below with further reference to the accompanying drawings.

Model Training Architecture

Figure 2:
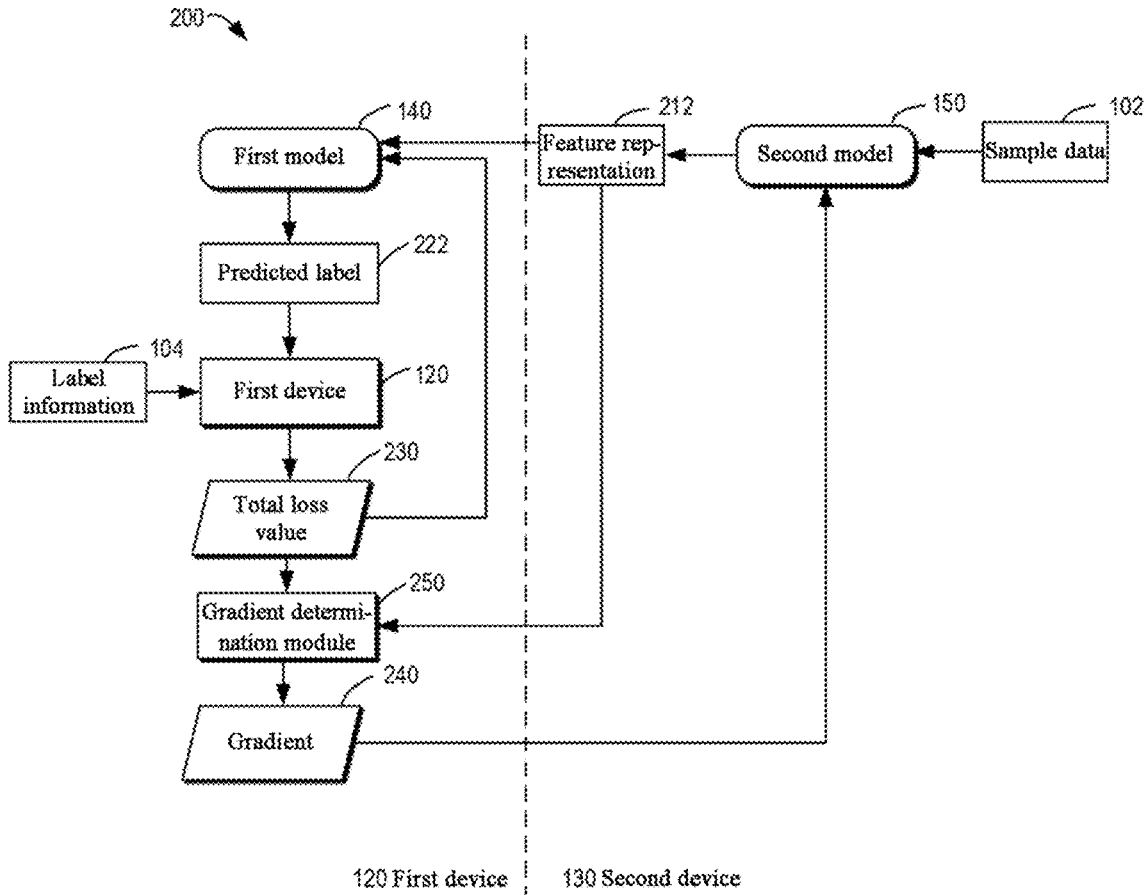
FIG. 2 shows a schematic diagram of an exemplary architecture of model joint training according to some embodiments of the disclosure.

FIG. 2 shows a schematic diagram of an example architecture 200 of model joint training according to some embodiments of the disclosure. The architecture 200 in FIG. 2 may be implemented in the joint training system 110 in FIG. 1. Various steps in the architecture 200 may be implemented by hardware, software, firmware, or any combination of them. In the architecture 200, the first model 140 and the second model 150 may be trained in a distributed manner using both the first device 120 and the second device 130.

The left side of FIG. 2 shows a processing process on the first device 120 side, and the right side of FIG. 2 shows a processing process on the second device 130 side. In some embodiments, the second model 150 may encode the sample data 102 to obtain the feature representation 212. The sample data may be encoded based on various encoders currently known and/or to be developed in the future to obtain the feature representation 212. The second device 130 may transmit the feature representation 212 to the first model 140 such that the first model 140 and the second model 150 can be subsequently jointly trained. It should be understood that although only one piece of sample data 102 is shown in FIG. 2, in some embodiments, a set of sample data or a batch of sample data, $X \in \mathcal{R}^{\pi \times d}$, may be used. In some embodiments, a feature representation for a batch of sample data may be represented as f(X). Herein, the feature representation is also referred to as an intermediate layer code (such as embedding) or an intermediate code (such as embedding).

In some embodiments, the second device 130 may be aggressive. That is, the second device 130 may attempt to infer or predict the label information 104 by using the feature representation 212. For instance, the second device 130 may predict label information for the feature representation 212 through a spectral attack, such as a 2-cluster outlier detection algorithm.

In some embodiments, positive sample data may be expressed as $\mathcal{F}^{+}$, and negative sample data may be expressed as $\mathcal{F}^{-}$. Label prediction may be carried out on the feature representation 212 by using a formula as follows:

$$|\langle f(X) - \mu_P, v \rangle|, \tag{1}$$

where f(X) denotes the feature representation 212, $\mu_F$ denotes a median of sample data F (including positive sample data and negative sample data), and 2 denotes a top singular vector of a covariance matrix of F.

With a batch of sample data $X \in \mathcal{R}^{\pi \times d}$ as an instance, the second device 130 may compute a median of empirical values and a covariance matrix of the batch of sample data to estimate $\mu_F$ and $v$. According to estimated $\mu_F$ and $v$ score |(f(X)−$\mu_F$,v) | can be computed for each piece of sample data in the batch by using formula (1). The second device 130 may divide all f(X) into two clusters based on the all computed scores.

In some embodiments, the second device 130 may further determine labels for the two obtained clusters by using a priori indication or empirical values. For instance, if a currently used dataset is unbalanced and dominated by negative samples, a negative label (such as 0) may be assigned to the larger cluster, and a positive label (such as 1) may be assigned to the less cluster.

In some embodiments, the second device 130 may enhance a capability of an own side model by using a network structure of any width and depth. In some cases, the second device 130 may have a strong attack capability, which may cause f(X) and the first device 120 to have the consistent capability to predict label information.

A process that the second device 130, which serves an attacker in some cases, infers label information 104 according to the feature representation 212 is described above. In some embodiments, it is undesirable that the second device 130 infers the label information 104 based on the feature representation 212. In this case, by using a joint training process of the first model 140 and the second model 150 described in detail below, the second device 130 can be prevented from inferring the label information 104. That is, through the joint training process of the first model 140 and the second model 150 described below, sensitive information of a user, such as label information, is prevented from being leaked.

As shown in FIG. 2, the first device 120 generates a predicted label 222 for the sample data 102 based on the feature representation 212 and according to the first model 140. Herein, the predicted label 222 may be a result of a logit output of the first model 140, which is also expressed as h(f(X)). The first device 120 is configured to determine, based on the feature representation 212, the label information 104 and the predicted label 222, a total loss value 230 for training the first model 140 and the second model 150.

In some embodiments, the first device 120 may determine a first loss based on the label information 104 and the predicted label 222. The first loss may be configured to denote a degree of difference between the predicted label 222 and the label information 104. For instance, the cross-entropy of the label information 104 and the predicted label 222 may be determined as the first loss. Herein, the first loss may be expressed as $L_c$. In this instance, the greater the value of the first loss, the greater the degree of difference between the predicted label 222 and the label information 104.

In some embodiments, the first device 120 may determine the second loss based on the feature representation 212 and the label information 104. The second loss may be configured to denote a degree of correlation between the feature representation 212 and the label information 104. For instance, in some embodiments, the first device 120 may determine a distance correlation coefficient of the feature representation 212 and the label information 104 as the second loss. The second loss determined by using the distance correlation coefficient may be expressed as:

$$L_d = DCOR(Y, F(X)), \qquad (2)$$

where $L_d$ denotes the second loss, Y denotes the label information 104, F(X) denotes the feature representation 212, and function DCOR( ) denotes a distance correlation coefficient function. It should be understood that the second loss $L_d$ may be determined by using any appropriate distance correlation coefficient function.

Additionally or alternatively, a logarithm of second loss $L_d$ described above is taken such that a second loss subjected to logarithm processing can be obtained. In the above example, the greater the value of the second loss, the larger the correlation between the feature representation 212 and the label information 104.

In some embodiments, the first device 120 may determine the total loss value 230 based on the first loss and the second loss. For instance, the first device 120 may determine a weighted sum of the first loss and the second loss as the total loss value 230. For instance, the total loss value 230 may be determined by using formula (3) above:

$$L = L_c + \alpha_d L_d, \qquad (3)$$

where L (which may also be expressed as l) denotes the total loss value 230, $L_c$ denotes the first loss, $L_d$ denotes the second loss, $\alpha_d$ is a value greater than or equal to zero, and $\alpha_d$ denotes a weight of the second loss.

In some embodiments, weight $\alpha_d$ of the second loss may be a preset value, such as 0.5 or another appropriate value between 0 and 1. Alternatively, weight $\alpha_d$ may be dynamically adjusted in a joint training process according to a result of the training process. It should be understood that the loss function described above is illustrative and not limitative.

In some embodiments, the first device 120 may determine the parameters of the first model 140 by minimizing the total loss value 230. For instance, the first device 120 may determine the parameters of the first model 140 by determining a minimum total loss value from the total loss value 230 and at least one other total loss value. The at least one other total loss value is previously or subsequently determined by the first device 120.

In some embodiments, the first device 120 may carry out an iterative update based on at least the loss function of formula (3) to determine the parameter values of the first model 140. For instance, the first model 140 is completely trained if iteration convergence is achieved or a preset number of times of iterations are achieved. In this way, the parameters of the first model 140 may be determined based on the total loss value 230.

By using the total loss value described above, the correlation between the feature representation 212 and the label information 104 can be reduced while the accuracy of the predicted label 222 is ensured. That is, the feature representation 212 is decoupled from the label information 104. In this way, the situation that the second device 130 or another attacker infers or predicts the label information 104 based on the feature representation 212 can be prevented. Therefore, sensitive information of the user, such as label information, is protected.

After determining the total loss value 230, the first device 120 may further determine, using a gradient determination module 250, a gradient 240 based on the total loss value 230. For instance, the first device 120 may determine a gradient 240 of the total loss value 230 with respect to the feature representation 212. In some embodiments, the gradient 240 may be determined by using formula (4) as follows:

$$g = \frac{\partial l}{\partial f(X)}, \qquad (4)$$

where g denotes the gradient 240, l denotes the total loss value 230, and f(X) denotes the feature representation 212.

In some embodiments, the first device 120 may transmit the determined gradient 240 to the second device 130 such that the second device 130 can determine the parameters of the second model 150 according to the gradient 240. For instance, the second device 130 may update, in response to receiving the gradient 240, the parameters of the second model 150 based on a chain rule.

By using the joint training process described above, the situation that the second device 130 infers the label information 104 using the feature representation 212 can be prevented. In this way, with the technical solution of the disclosure, sensitive data can be better protected while the performances of the first model and the second model are ensured. In addition, with the technical solution of the disclosure, a model can be jointly trained without knowing the structures of all models. Thus, the solution is easy to implement.

Example Results

Figure 3:
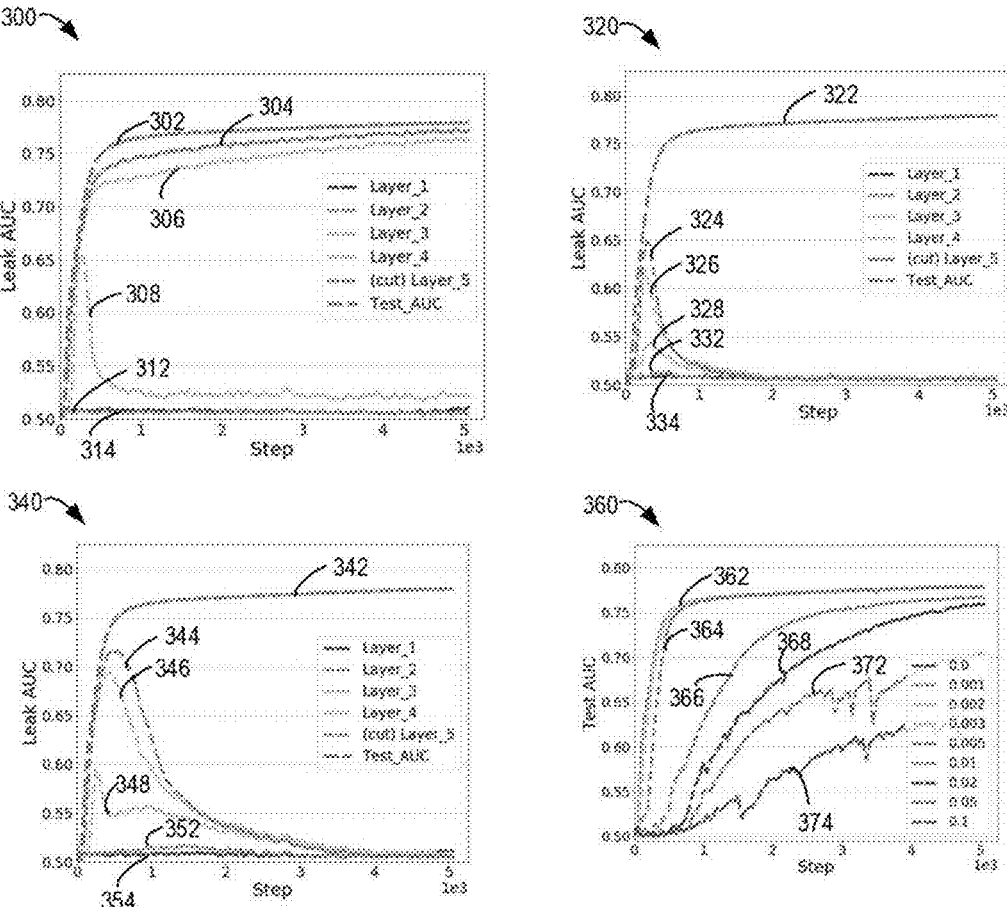
FIG. 3 shows a schematic diagram of a result of data protection according to some embodiments of the disclosure.

FIG. 3 shows a schematic diagram of a result of protecting data according to some embodiments of the disclosure. The result 300 shows attack areas under curves (AUCs) on different layers of the second device 130 through a spectral attack, etc. in a case of protecting data without using the technical solution of the disclosure. The attack AUC, or AUC for short, may be configured to denote the capability of an attacker (such as the second device 130) to distinguish between positive and negative labels. An attack AUC close to 0.5 is regarded as being approximate random guess. In other words, an attack AUC close to 0.5 can be regarded as being non-dangerous, that is, data is safe.

In the result 300, a curve 302 shows a test AUC (that is, an AUC of the first device 120). Curves 302, 304, 306, 308, 312 and 314 show an AUC of layer 5, an AUC of layer 4, an AUC of layer 3, an AUC of layer 2 and an AUC of layer 1 of the attacker (that is, the second device 130) respectively. According to the result 300, it can be seen that the attacker (such as the second device 130) has an extremely strong attack capability. Especially when the attacker has more than 4 layers, the attack capability approaches the utility of the model.

The result 320 shows attack AUCs on different layers of the second device 130 through a spectral attack, etc. in a case of protecting data using the technical solution of the disclosure. In the result 320, weight $\alpha_d$ is set to 0.002. In the result 320, a curve 322 shows a test AUC (that is, an AUC of the first device 120). Curves 324, 326, 328, 332 and 334 show an AUC of layer 5, an AUC of layer 4, an AUC of layer 3, an AUC of layer 2 and an AUC of layer 1 of the attacker (that is, the second device 130) respectively.

Similarly, the result 340 shows attack AUCs on different layers of the second device 130 through a spectral attack, etc. in a case of protecting data without using the technical solution of the disclosure. In the result 340, weight $\alpha_d$ is set as 0.005. In the result 340, a curve 342 shows a test AUC (that is, an AUC of the first device 120). Curves 344, 346, 348, 352 and 354 show an AUC of layer 5, an AUC of layer 4, an AUC of layer 3, an AUC of layer 2 and an AUC of layer 1 of the attacker (that is, the second device 130) respectively.

It can be seen from the results 320 and 340 that although the attacker (such as the second device 130) has a strong attack capability, the AUC can be effectively close to a desired value of 0.5 by using the protecting data solution in the disclosure. Particularly, in the case of the result 320 (in which weight $\alpha_d$ is set to 0.002), the AUC of each layer is close to 0.5. It is also indicated that the method for protecting data in the solution is extremely effective and can well prevent sensitive data from being leaked.

The result 360 shows AUC curves in cases of different weights $\alpha_d$. Curves 362, 364, 366, 368, 372 and 374 in the result 360 show AUC curves, that is, test AUC curves, of the first device 120 in cases that weights $\alpha_d$ are 0.002, 0.005, 0.01, 0.02, 0.05 and 0.1 respectively. In some embodiments, if a greater $\alpha_d$ is chosen, data protection can be improved. That is, the privacy of data is good, but the utility of the model will become worse. Conversely, if a smaller $\alpha_d$ is chosen, the privacy of the data will become worse, and utility of the model will be similar to that of a vanilla model. That is, the utility of the model will be better. Thus, in some embodiments, the privacy of the data and the utility of the model can have better performances by choosing appropriate weight $\alpha_d$. For instance, in some embodiments, a value between 0.002 and 0.005 can be chosen as weight $\alpha_d$. It should be understood that a value of weight $\alpha_d$ is merely exemplary and is not intended to limit the scope of the disclosure.

It can be seen from the above results that by using the joint training process described according to the disclosure, the situation that the second device 130 infers the label information 104 by using the feature representation 212 can be prevented. In particular, the security of the sensitive information can be ensured even when the second device 130 has strong aggressiveness. In addition, by appropriately setting the weight of the second loss in the total loss value, the sensitive data can be better protected while the utility of the first model and the second model is ensured.

Example Process

FIG. 4 shows a flow diagram of a process 400 for protecting data according to some embodiments of the disclosure. The process 400 may be implemented at the joint training system 110 and/or the application system 160.

At block 410, a feature representation 212 generated by the second device 130 based on the sample data 102 and according to the second model 150 is acquired by the first device 120. The first device 120 has the label information 104 for the sample data 102. The first device 120 and the second device 130 are configured to jointly train a first model 140 at the first device 120 and the second model 150 at the second device 130.

In some embodiments, the label information 104 includes sensitive data of a process for processing the sample data 102. In some embodiments, the second device 130 has no label information 102.

At block 420, a predicted label 222 for the sample data 102 is generated by the first device 120 based on the feature representation 212 and according to the first model 140. At block 430, a total loss value 230 for training the first model 140 and the second model 150 is determined by the first device 120 based on the feature representation 212, the label information 104 and the predicted label 222.

In some embodiments, a first loss may be determined based on the label information 104 and the predicted label 222. The first loss denotes a degree of difference between the predicted label 222 and the label information 104. In some embodiments, a second loss may be determined based on the feature representation 212 and the label information 104. The second loss denotes a degree of correlation between the feature representation 212 and the label information 104. For instance, in some embodiments, a distance correlation coefficient of the feature representation 212 and the label information 104 may be determined as the second loss.

In some embodiments, the total loss value 230 may be determined based on the first loss and the second loss. For instance, in some embodiments, a weighted sum of the first loss and the second loss may be determined as the total loss value 230. For instance, the total loss value 230 may be determined by using formula (3).

In some embodiments, the first device 120 may determine the parameter of the first model 140 by determining a minimum total loss value from the total loss value and at least one other total loss value. The at least one other total loss value is previously or subsequently determined by the first device 120.

In some embodiments, the first device 120 may determine a gradient 240 of the total loss value 230 with respect to the feature representation 212. For instance, the gradient 240 may be determined by using formula (4).

In some embodiments, the first device 120 may transmit the determined gradient 240 to the second device 130. The second device 130 may determine the parameter of the second model 150 by using the gradient 240.

Example Apparatus and Device

Figure 5:
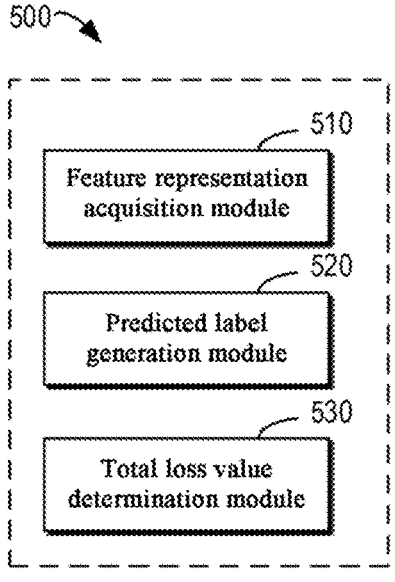
FIG. 5 shows a block diagram of an apparatus for protecting data according to some embodiments of the disclosure.

FIG. 5 shows a block diagram of an apparatus 500 for protecting data according to some embodiments of the disclosure. The apparatus 500 may be implemented as or included in the joint training system 110 and/or the application system 160. Modules/components in the apparatus 500 may be implemented by hardware, software, firmware or any combination of them.

As shown in the figure, the apparatus 500 includes a feature representation acquisition module 510 configured to acquire a feature representation generated by a second device based on the sample data and according to the second model. The apparatus 500 has the label information for the sample data. The apparatus and the second device are configured to jointly train the first model at the apparatus and the second model at the second device.

In some embodiments, the label information includes sensitive data of a processing result of the sample data by a user. In some embodiments, the second device has no label information.

The apparatus 500 further includes a predicted label generation module 520 configured to generate a predicted label for the sample data based on the feature representation and according to the first model.

The apparatus 500 further includes a total loss value determination module 530 configured to determine, based on the feature representation, the label information and the predicted label, a total loss value for training the first model and the second model.

In some embodiments, the total loss value determination module 530 includes a first loss determination module configured to determine a first loss based on the label information and the predicted label. The first loss denotes a degree of difference between the predicted label and the label information.

In some embodiments, the total loss value determination module 530 further includes a second loss determination module configured to determine a second loss based on the feature representation and the label information. The second loss denotes a degree of correlation between the feature representation and the label information. In some embodiments, the second loss determination module includes a distance correlation coefficient determination module configured to determine a distance correlation coefficient of the feature representation and the label information as the second loss.

In some embodiments, the total loss value determination module 530 further comprises a second total loss value determination module are configured to determine a total loss value based on the first loss and the second loss. In some embodiments, the second total loss value determination module includes a weighted sum module configured to determine a weighted sum of the first loss and the second loss as the total loss value.

In some embodiments, the apparatus 500 further includes a minimum total loss value determination module configured to determine the parameter of the first model by determining a minimum total loss value from the total loss value and at least one other total loss value. The at least one other total loss value is previously or subsequently determined by the first device 120.

In some embodiments, the apparatus 500 further includes a gradient determination module configured to determine, by the first device, a gradient of the total loss value with respect to the feature representation. In some embodiments, the apparatus 500 further includes a transmission module configured to transmit the gradient to the second device such that the second device determines the parameter of the second model according to the gradient.

Figure 6:
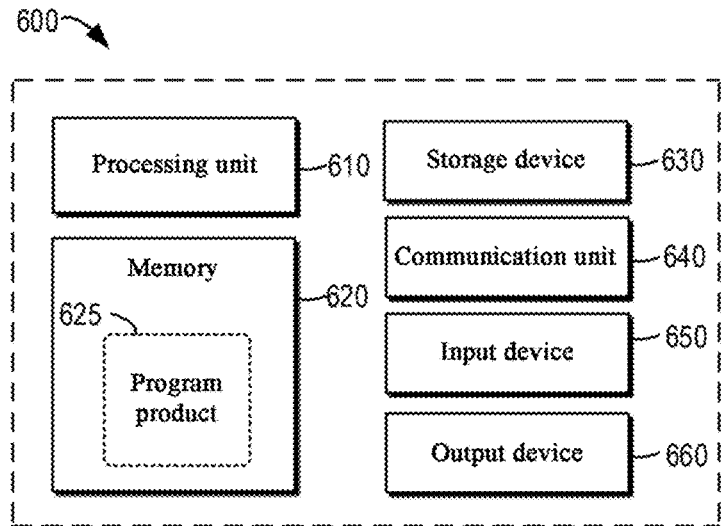
FIG. 6 shows a block diagram of a device capable of implementing a plurality of embodiments of the disclosure.

FIG. 6 shows a block diagram of a computing device 600 in which one or more embodiments of the disclosure can be implemented. It should be understood that the computing device 600 shown in FIG. 6 is merely exemplary and should not be construed as any limitation on the functions or scopes of the embodiments described herein. The computing device 600 shown in FIG. 6 may be configured to implement the joint training system 110 and/or the application system 160 in FIG. 1.

As shown in FIG. 6, the computing device 600 is in the form of a general-purpose computing device. Components of the computing device 600 may include but are not limited to one or more processors or processing units 610, a memory 620, a storage device 630, one or more communication units 640, one or more input devices 650, and one or more output devices 660. The processing unit 610 may be a real or virtual processor and can execute various processing according to programs stored in the memory 620. In a multi-processor system, a plurality of processing units execute computer-executable instructions in parallel to increase a parallel processing capability of the computing device 600.

The computing device 600 generally includes a plurality of computer storage media. Such media may be any available media that are accessible by the computing device 600, and include but not limited to volatile and nonvolatile media, and removable and non-removable media. The memory 620 may be a volatile memory (such as a register, a cache, a random access memory (RAM)), a nonvolatile memory (such as a read-only memory (ROM), an electrically erasable programmable read-only memory (EEPROM), and a flash memory), or some combination thereof. The storage device 630 may be a removable or non-removable medium and may include a machine-readable medium such as a flash drive, a magnetic disk, or any other media that can be configured to store information and/or data (such as training data for training) and that can be accessed within the computing device 600.

The computing device 600 may further include additional removable/non-removable, and volatile/nonvolatile storage media. Although not shown in FIG. 6, magnetic disk drives for reading from or writing to removable and nonvolatile magnetic disks (such as "floppy disks") and optical disk drives for reading from or writing to removable and non-volatile optical disks may be provided. In these cases, each drive may be connected to a bus (not shown) through one or more data medium interfaces. The memory 620 may include a computer program product 625 having one or more program modules. These program modules are configured to execute various methods or actions in various embodiments of the disclosure.

The communication unit 640 is in communication with other computing devices through a communication medium. Additionally, the functions of the components of the computing device 600 may be implemented in a single computing cluster or a plurality of computing machines. These computing machines can be in communication through communication connections. Thus, the computing device

600 may operate in a networked environment by using logical connections to one or more other servers, a network personal computer (PC), or another network node.

The input device 650 may be one or more input devices, such as a mouse, a keyboard and a trackball. The output device 660 may be one or more output devices, such as a display, a speaker and a printer. The computing device 600 may be in communication, through the communication unit 640 as needed, with one or more external devices (not shown) such as a storage device and a display device, one or more devices that enable a user to interact with the computing device 600, or any device (such as a network card and a modem) that enables the computing device 600 to be in communication with one or more other computing devices. Such communication may be executed via an input/output (I/O) interface (not shown).

According to an exemplary implementation of the disclosure, a computer-readable storage medium is provided. The computer-readable storage medium stores a computer-executable instruction. The computer-executable instruction is executed by a processor to implement the method described above. According to an exemplary implementation of the disclosure, a computer program product is also provided. The computer program product is tangibly stored on a non-transitory computer-readable medium and includes a computer-executable instruction. The computer-executable instruction is executed by a processor to implement the method described above.

Various aspects of the disclosure are described herein with reference to flow diagrams and/or block diagrams of the method, apparatus, device, and computer program product according to embodiments of the disclosure. It should be understood that each block of the flow diagram and/or the block diagram and combinations of blocks in the flow diagram and/or the block diagram can be implemented by a computer-readable program instruction.

These computer-readable program instructions may be provided to a processing unit of a general-purpose computer, a special-purpose computer, or other programmable data processing apparatuses to produce a machine, such that these instructions generate an apparatus for implementing specified functions/actions in one or more blocks of the flow diagram and/or the block diagram when executed by the processing unit of the computer or other programmable data processing apparatuses. These computer-readable program instructions may also be stored in a computer-readable storage medium. These instructions cause a computer, a programmable data processing apparatus, and/or other devices to work in a particular manner. Thus, the computer-readable medium storing an instruction includes an article of manufacture including instructions for implementing various aspects of specified functions/actions in one or more blocks of the flow diagram and/or the block diagram The computer-readable program instructions may be loaded onto a computer, other programmable data processing apparatuses, or other devices, such that a series of operational steps are executed on the computer, other programmable data processing apparatuses, or other devices to produce a computer-implemented process, thereby the instructions executed on the computer, other programmable data processing apparatuses, or other devices implement the specified functions/actions in one or more blocks of the flow diagram and/or the block diagram.

Flow diagrams and block diagrams in figures show system architectures, functions and operations, which may be implemented by systems, methods and computer program products according to a plurality of embodiments of the disclosure. In this regard, each block in flow diagrams or block diagrams can denote a module, a program segment, or a part of an instruction, which includes one or more executable instructions configured to implement specified logical functions. In some embodiments as substitutions, functions noted in blocks can also occur in sequences different from those in figures. For instance, functions represented by two continuous blocks can be executed substantially in parallel in practice, and sometimes implemented in reverse sequences, which depends on the involved functions. It should also be noted that each block in flow diagrams and/or block diagrams, and combinations of the blocks in the flow diagrams and/or the block diagrams, can be implemented by means of dedicated hardware-based systems that execute specified functions or actions, or can be implemented by means of combinations of dedicated hardware and computer instructions.

Various embodiments of the disclosure are described above. The above descriptions are exemplary, not exhaustive and not limited to the disclosed various embodiments. Plenty of modifications and variations will be apparent to those of ordinary skill in the art without departing from the scopes and spirits of the described various embodiments. The terms used herein are chosen to best explain the principles and practical application of various embodiments or technical improvement in the market, or enable others of ordinary skill in the art to understand various embodiments disclosed herein.

We claim:

1. A method for protecting data, comprising:

acquiring, by a first device, a feature representation generated by a second device based on sample data and according to a second model, the first device having label information for the sample data, and the first device and the second device being configured to jointly train a first model at the first device and the second model at the second device;

generating, by the first device based on the feature representation and according to the first model, a predicted label for the sample data; and determining, by the first device based on the feature representation, the label information and the predicted label, a total loss value for training the first model and the second model, wherein determining the total loss value comprises:

determining a first loss based on the label information and the predicted label, wherein the first loss denotes a degree of difference between the predicted label and the label information;

determining a second loss based on the feature representation and the label information, wherein the second loss denotes a degree of correlation between the feature representation and the label information; and determining the total loss value based on the first loss and the second loss.

2. The method according to claim 1, wherein determining the total loss value comprises:

determining a weighted sum of the first loss and the second loss as the total loss value.

3. The method according to claim 1, wherein determining the second loss comprises:

determining a distance correlation coefficient of the feature representation and the label information as the second loss.

4. The method according to claim 1, further comprising:

determining a parameter of the first model by determining a minimum total loss value from the total loss value and at least one other total loss value, wherein the at least one other total loss value is previously or subsequently determined by the first device.

5. The method according to claim 1, further comprising:

determining, by the first device, a gradient of the total loss value with respect to the feature representation; and transmitting the gradient to the second device, to cause the second device to determine a parameter of the second model according to the gradient.

6. The method according to claim 1, wherein the label information comprises sensitive data of a processing process of the sample data by a user.

7. The method according to claim 1, wherein the second device has no label information.

8. An electronic device, comprising:

at least one processing unit; and at least one memory, wherein the at least one memory is coupled to the at least one processing unit and stores an instruction for execution by the at least one processing unit, and the instruction, when executed by the at least one processing unit, causes the electronic device to execute actions comprising:

acquiring, by the electronic device, a feature representation generated by a second device based on sample data and according to a second model, the electronic device having label information for the sample data, and the electronic device and the second device being configured to jointly train a first model at the electronic device and the second model at the second device;

generating, based on the feature representation and according to the first model, a predicted label for the sample data; and determining, based on the feature representation, the label information and the predicted label, a total loss value for training the first model and the second model, wherein determining the total loss value comprises:

determining a first loss based on the label information and the predicted label, wherein the first loss denotes a degree of difference between the predicted label and the label information;

determining a second loss based on the feature representation and the label information, wherein the second loss denotes a degree of correlation between the feature representation and the label information; and determining the total loss value based on the first loss and the second loss.

9. The electronic device according to claim 8, wherein determining the total loss value comprises:

determining a weighted sum of the first loss and the second loss as the total loss value.

10. The electronic device according to claim 8, wherein determining the second loss comprises:

determining a distance correlation coefficient of the feature representation and the label information as the second loss.

11. The electronic device according to claim 8, wherein the actions further comprise:

determining a parameter of the first model by determining a minimum total loss value from the total loss value and at least one other total loss value, wherein the at least one other total loss value is previously or subsequently determined by the electronic device.

12. The electronic device according to claim 8, wherein the actions further comprise:

determining, by a first device, a gradient of the total loss value with respect to the feature representation; and transmitting the gradient to the second device, to cause the second device to determine a parameter of the second model according to the gradient.

13. The electronic device according to claim 8, wherein the label information comprises sensitive data of a processing process of the sample data by a user.

14. The electronic device according to claim 8, wherein the second device has no label information.

15. A non-transitory computer-readable storage medium, having a computer program stored thereon, wherein the program, when executed by a processor, implements a method comprising:

acquiring, by a first device, a feature representation generated by a second device based on sample data and according to a second model, the first device having label information for the sample data, and the first device and the second device being configured to jointly train a first model at the first device and the second model at the second device;

generating, by the first device based on the feature representation and according to the first model, a predicted label for the sample data; and determining, by the first device based on the feature representation, the label information and the predicted label, a total loss value for training the first model and the second model, wherein determining the total loss value comprises:

determining a first loss based on the label information and the predicted label, wherein the first loss denotes a degree of difference between the predicted label and the label information;

determining a second loss based on the feature representation and the label information, wherein the second loss denotes a degree of correlation between the feature representation and the label information; and determining the total loss value based on the first loss and the second loss.

16. The non-transitory computer-readable storage medium according to claim 15, wherein determining the total loss value comprises:

determining a weighted sum of the first loss and the second loss as the total loss value.

17. The non-transitory computer-readable storage medium according to claim 15, wherein determining the second loss comprises:

determining a distance correlation coefficient of the feature representation and the label information as the second loss.

* * * * *